United States Patent [19]

Hug et al.

[11] 4,230,902
[45] Oct. 28, 1980

[54] MODULAR LASER PRINTING SYSTEM

[75] Inventors: William F. Hug, Pasadena; Leonard C. De Benedictis, Los Angeles, both of Calif.

[73] Assignee: Xerox Corporation, Stamford, Conn.

[21] Appl. No.: 911,021

[22] Filed: May 30, 1978

[51] Int. Cl.³ .................... H04L 15/34; H04N 1/04
[52] U.S. Cl. .................................. 178/15; 346/76 L; 350/285; 358/285
[58] Field of Search .................... 178/15; 346/76 L; 219/121 L, 121 LM; 358/285, 286, 199; 350/285; 33/DIG. 21

[56] References Cited

U.S. PATENT DOCUMENTS

| | | | |
|---|---|---|---|
| 3,966,327 | 6/1976 | Hanson | 350/285 |
| 4,032,743 | 6/1977 | Erbach et al. | 346/76 L |

Primary Examiner—Thomas A. Robinson
Attorney, Agent, or Firm—Irving Keschner

[57] ABSTRACT

A laser printing system having a plurality of modules is provided wherein one of the modules comprises a laser, modulator and part of the system optics, the light output from the module being directed to a rotating scanner. The components in the module are secured to a common base member to minimize relative movement between the components, the alignment between the output laser beam and a cylindrical lens, the cylindrical lens being one element of the module optics, thereby being substantially maintained so that the energy distribution of the laser beam focused onto a recording medium across a scan line is maintained at its optimum value. If the laser or other component in the module becomes defective, the module is removed and replaced with a similar module, the critical alignment between the laser beam and the cylindrical lens thereby being maintained. The module, when replaced, fits into a corresponding mating portion of the laser printing system so that the module output beam retains its relative alignment with system components external to the module.

12 Claims, 5 Drawing Figures

MODULAR LASER PRINTING SYSTEM

BACKGROUND OF THE INVENTION

Recently, printing systems utilizing lasers to reproduce information or laser sensitive mediums have been announced by various manufacturers. Typically, the system includes a laser for generating a laser beam, a modulator, such as an acousto-optic modulator, for modulating the laser beam in accordance with input information to be reproduced, a multi-faceted scanner for scanning the modulated laser beam across a medium on a line to line basis, various optical components to focus and align the laser beam onto the medium, the laser sensitive recording medium itself and, if necessary, a means for developing the information in human readable form. A typical representation of printing systems utilizing lasers is shown, for example, in U.S. Pat. No. 3,922,485, the patent disclosing the use of a xerographic drum as the recording medium and means for developing the latent electrostatic image formed on the drum.

In some printing systems it is required that a cylindrical lens be interposed between the modulated laser beam and the scanner to provide a fan fold light output beam which fully illuminates at least one facet of the scanner. The cylindrical lens is preferably aligned with the laser beam to redistribute the energy of the modulated laser beam in a manner whereby the energy distribution of the laser beam incident on the recording medium is substantially symmetrical about the start of scan and end of scan positions of the medium, maximum energy ideally occuring at the center of the scanline. This is particularly important in those systems which utilize a xerographic recording medium.

In general, the laser portion of the overall printing system is regarded as the "weak link" in that the laser would be the first component to fail or in some way become inoperative. The accepted approach, from a field service standpoint, to make the printing system operative, would be to remove the defective laser and replace it with another laser, either a new laser or a repaired laser. In regards to the configuration discussed above, it has been determined that the relative positioning of the laser beam with respect to the cylindrical lens is extremely critical, this critically affecting the energy distribution of the laser beam which scans the medium. If the laser beam is moved with respect to the cylindrical lens a small distance, say for example 0.001 of an inch in the scanning direction, the beam energy incident on the polygon facet will shift a substantial fraction of the facet aperture in the scanning or tangential direction, the displacement being determined by the magnification factor of the cylindrical lens which in turn will effect the beam energy distribution at the surface of the recording medium. The relatively tight tolerance required between the laser beam and the cylindrical lens has made it extremely time consuming and costly to replace the laser independently of the cylindrical lens and maintain the necessary tight tolerances therebetween.

Therefore, what is desired in a laser printing system is an arrangement wherein tolerances between the laser beam and certain of the down stream optical elements can be maintained within acceptable limits without the attendant increased costs and time delays which would otherwise occur.

SUMMARY OF THE PRESENT INVENTION

The present invention provides a technique for maintaining the relative alignment between a laser beam, in a modular laser printing system, and one of the optical elements associated therewith and in particular, a cylindrical lens, in a manner such that the energy distribution of the beam as it is scanned across a recording medium is maintained at an optimum value. The alignment between the cylindrical lens and the laser beam is maintained by mounting, inter alia, the laser and cylindrical lens to a common support member within a module, each element being fixed with respect to the common support member. If the laser fails or otherwise becomes defective, or if any of the other elements in the module similarly fails, the whole module is capable of being removed and replaced with a similar module. In other words, a field replaceable module is provided such that the required alignment tolerances between the cylindrical lens and the laser beam is maintained. The failed laser in the removed module can be repaired or replaced with a new one, the laser then being mounted in the module, the initially removed module thereafter being capable of being reutilized in the laser printing system. The module output beam, when the module or similar module is replaced in the printing system, retains its relative alignment with system components external to the module.

It is an object of the present invention to provide a modular type laser printing system wherein a module having a defective element therein can be removed and replaced with a similar module which is operative.

It is a further object of the present invention to provide a laser printing system which includes at least one module, said one module containing, inter alia, a laser and associated optical components, the laser and other elements being fixedly mounted to a common support member.

It is still a further object of the present invention to provide a laser module for use in a laser printing system wherein the relative alignment between a laser beam and an optical element, such as a cylindrical lens within the module, is maintained.

It is a further object of the present invention to provide a module for use in a laser printing system wherein the relative alignment between a laser and an optical element, such as a cylindrical lens, within the module is maintained whereby the energy distribution of the laser beam which scans across the surface of a recording medium is maintained within predetermined tolerances.

It is a still further object of the present invention to provide a removable module for use in a laser printing system, the module being interchangeable with other similarly configured modules, the module output beam, when the module is replaced in the printing system, maintaining its relative alignment with system components external to said module.

DESCRIPTION OF THE DRAWINGS

For a better understanding of the invention as well as other objects and features thereof, reference is made to the following description which is to be read in conjunction with the accompanying drawing wherein.

DESCRIPTION OF THE PREFERRED EMBODIMENT

Figure 1:
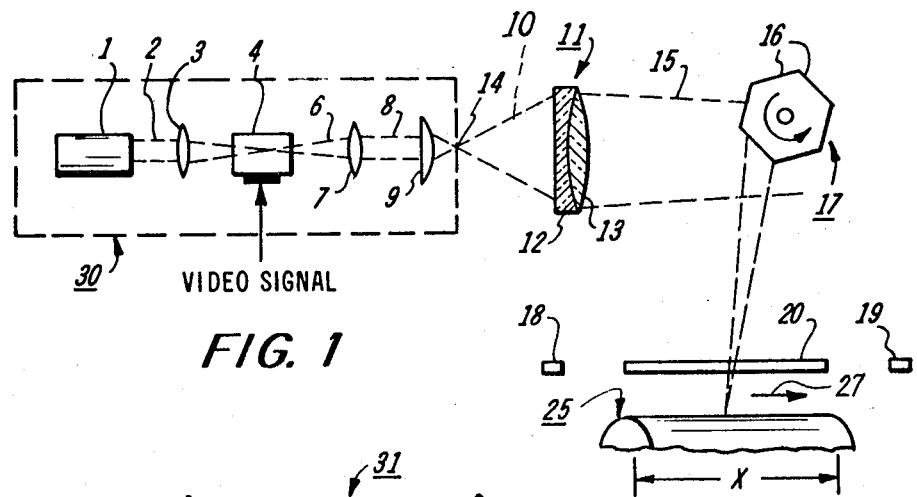
FIG. 1 is a simplified representation of a laser printing system in accordance with the present invention.

FIG. 1 illustrates a simplified representation of the optical and recording portions of the laser printing system in accordance with the present invention.

A light source 1 provides the original light beam for utilization by the printing system. The light source 1 is preferably a laser, such as a helium-cadmium or helium-neon laser, which generates a collimated beam of monochromatic light 2. The monochromatic light beam is focused by spherical lens 3 onto modulator 4, the light beam 2 being modulated in conformance with the information contained in a video signal.

Modulator 4 may be any suitable acousto-optic or electro-optical modulator for recording the video information in the form of a modulated light beam 6 at the output of the modulator 4. By means of the modulator 4 the information within the video signal is represented by the modulated light beam 6.

The light beam 6 is incident on spherical lens element 7 which acts to defocus (or collimate) the incident beam 6. The collimated light output beam 8 from lens 7 is then directed to cylindrical lens 9 which spreads the beam energy in the scan (or tangential) direction (fan fold output) as illustrated by reference numeral 10. Beam 10 is directed to imaging lens 11. Imaging lens 11, in the embodiment illustrated, is a doublet and comprises a biconcave lens element 12 cemented to a convex lens element 13. Other lens arrangements may be utilized, the only requirement being that the imaging lens 11 is capable of forming an image of laser beam spot 14 on the surface of medium 25. Imaging lens 11 produces a beam 15 which impinges upon and may illuminate a plurality of contiguous facets 16 of a scanning polygon 17 as shown.

In the preferred embodiment, the rotational axis of polygon 17 is orthogonal to the plane in which light beams 6 travels. The facets 16 of a polygon 17 are mirrored surfaces for the reflection by any illuminating light impinging upon them. With the rotation of the polygon 17, light beams are reflected from the illuminated facets and turned through a scan angle for flying spot scanning. Alternatively, flying spot scanning could be provided by any other suitable device, such as mirrored piezoelectric crystals or planar reflecting mirrors which are driven in an oscillatory fashion.

Medium 25 may be a xerographic drum (portion illustrated) which rotates consecutively through a charging station comprising a corona discharge device, an exposure station where the beam from the rotating polygon 17 would traverse a scan width x on the drum in the direction of arrow 27 through a developing station depicted by a cascade development enclosure, and a transfer station where a web of copy paper is passed in contact with the drum and receives an electrostatic discharge to induce a transfer of the developed image from the drum to the copy paper.

A fusing device fixes the images to the copy paper.

Usable images are provided in that the information content of the scanning spot is represented by the modulated or variant intensity of light respective to its position within the scan width x. As the spot traverses a charged surface, the spot dissipates the electrostatic charge in accordance with its light intensity. The electrostatic charge pattern thus produced would be developed in the developing station and then transferred to the final copy paper. The xerographic drum would be cleaned by some cleaning device such as a rotating brush before being recharged by the charging device. In this manner, the information content of the scanned spot is recorded on a more permanent and useful medium. Of course, alternative prior art techniques may be employed to cooperate with a scanned spot in order to utilize the information contained thereon. U.S. Pat. No. 3,922,485 describes in more detail the technique for providing usable images. The polygon 17 is continuously driven by a motor (not shown) and may be synchronized in rotation to a synchronization signal representing the scan rate used to obtain the original video signal by the signals generated by start of scan and end of scan detectors 18 and 19, respectively. In the case of the utilization of a xerographic drum, the rotation rate of the drum determines the spacing of the scan lines.

Since runout errors and polygon facet errors may cause poor results in terms of the quality of image transfer to the scanned medium, a cylindrical lens 20 is positioned in the optical path between the polygon and the scanned medium with its aperture aligned with the aperture of the polygon 17. As shown in FIG. 1, the plane of no power of the lens 20 is substantially parallel to the direction of scan or the tangential plane. The interposition of cylindrical lens 20 in the optical path compensates for such runout effects. A more detailed description of the correction effect provided by lens 20 is set forth in U.S. Pat. No. 4,040,096.

Figure 2:
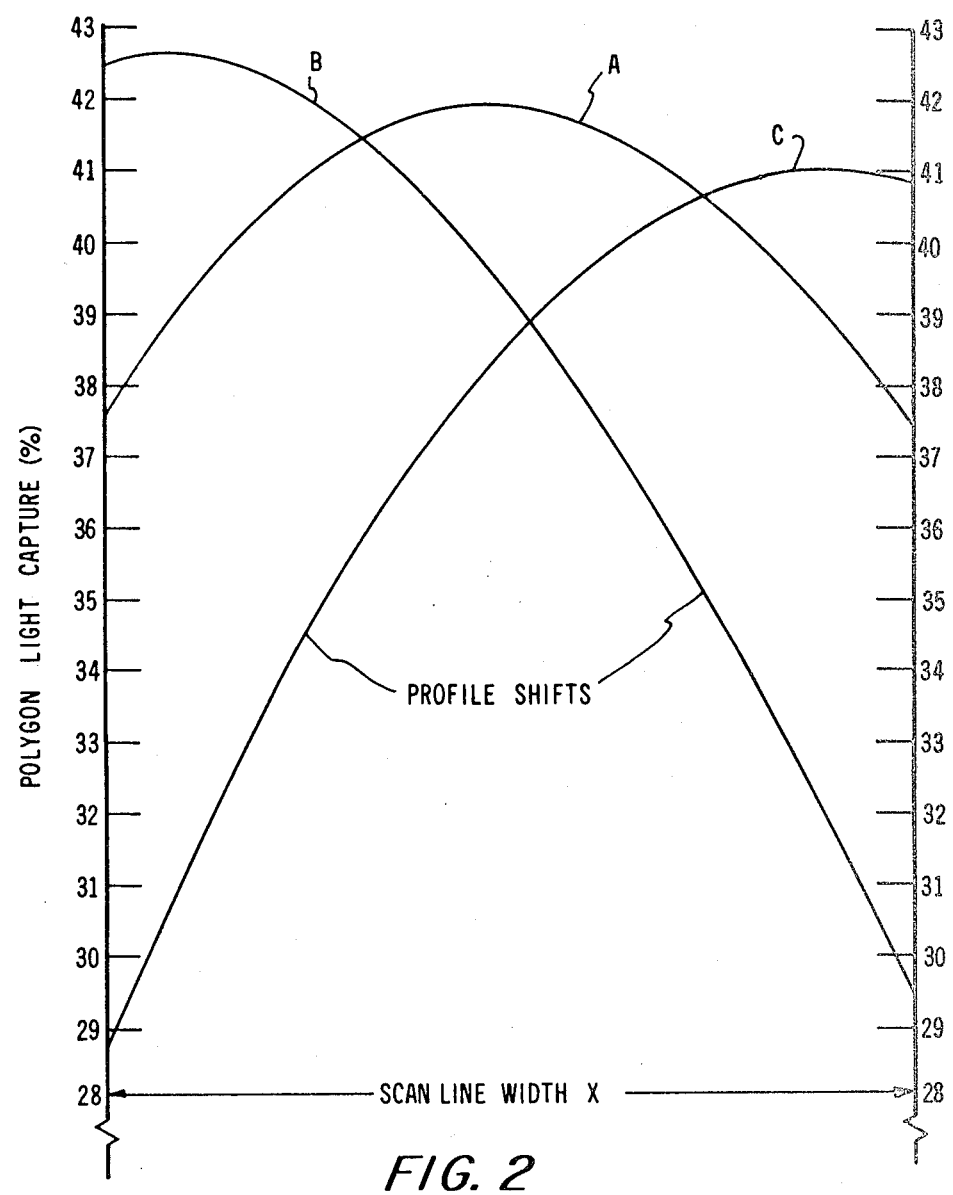
FIG. 2 is a graph illustrating the energy densities of a laser beam as it scans across a medium.

Prior laser printing systems have been typically characterized in that the components utilized have been packaged or assembled in the system without specific attention to the other components with respect to maintaining a fixed relative optical alignment therebetween. Further, these prior art systems have not been designed such that the laser component could be easily removed in the field and replaced or repaired if the laser fails or otherwise becomes inoperative. Further, it has been determined that the alignment of the laser beam with certain of the optical elements in the beam path is critical in order to be within certain preferred system tolerances as will be explained hereinafter. Removing the inoperative laser from the printing system and then replacing it with a new or repaired laser causes problems since the field or service representative may have to spend considerable time and effort in order to adjust the beam alignment to within the desired tolerances. Beam wander induced by misalignment of the laser beam with respect to a subsequent critical optical element in the optical beam path and in particular, with respect to the optical axis of cylindrical lens 9, will significantly effect the beam energy distribution as the polygon 17 causes beam 15 to scan across the surface of medium 25 unless such beam wander can be compensated for. In particular, if the laser beam 8 is moved with respect to cylindrical lens 9 a small distance, say for example 0.001 inch in the tangential or scanning direction, the beam energy incident on the polygon facet 16 will shift a substantial fraction of the facet aperture in the scanning or tangential direction, the displacement being determined by the magnification factor of cylindrical lens 9 which in turn will effect the beam energy distribution at the surface of recording medium 25. This can be seen in FIG. 2 which is a graph illustrating the shift in energy distribution caused by beam wander. The ordinate of the graph, representing the amount of the light beam 15 one of the polygon facets 16 "captures" also represents the percentage of energy which is incident on the polygon facets and then distributed across the scan line to be formed on the surface of medium 25. Curve A represents the optimum relationship with the maximum beam energy being at the midpoint of the polygon aperture (and therefore the scan line) with a symmetrical falloff in the energy distribution on each side of the facet aperture (midscan point). Curve B represents the energy distribution across the facet aperture (scan line) when the laser beam 2 is misaligned in the tangential direction with respect to the optical axis of lens 9 whereas curve C represents the energy distribution across the facet aperture (scan line) when the laser beam 2 is misaligned in the tangential direction (opposite to the tangential misalignment of Curve B). As can be observed with respect to curves B and C, the energy distribution is non-symmetrical with respect to the midpoint of the facet aperture (scanline) and would result in poor quality in the reproduced information.

In accordance with the teachings of the present invention, the relative alignment between the laser beam and the critical optical element, which in the configuration in FIG. 1, has been determined to be cylindrical lens 9, is maintained by mounting the components or elements shown within dashed box 30 on a common support member to form a module which in turn can be accurately positioned within the remaining portions of the laser printing system.

Figure 3:
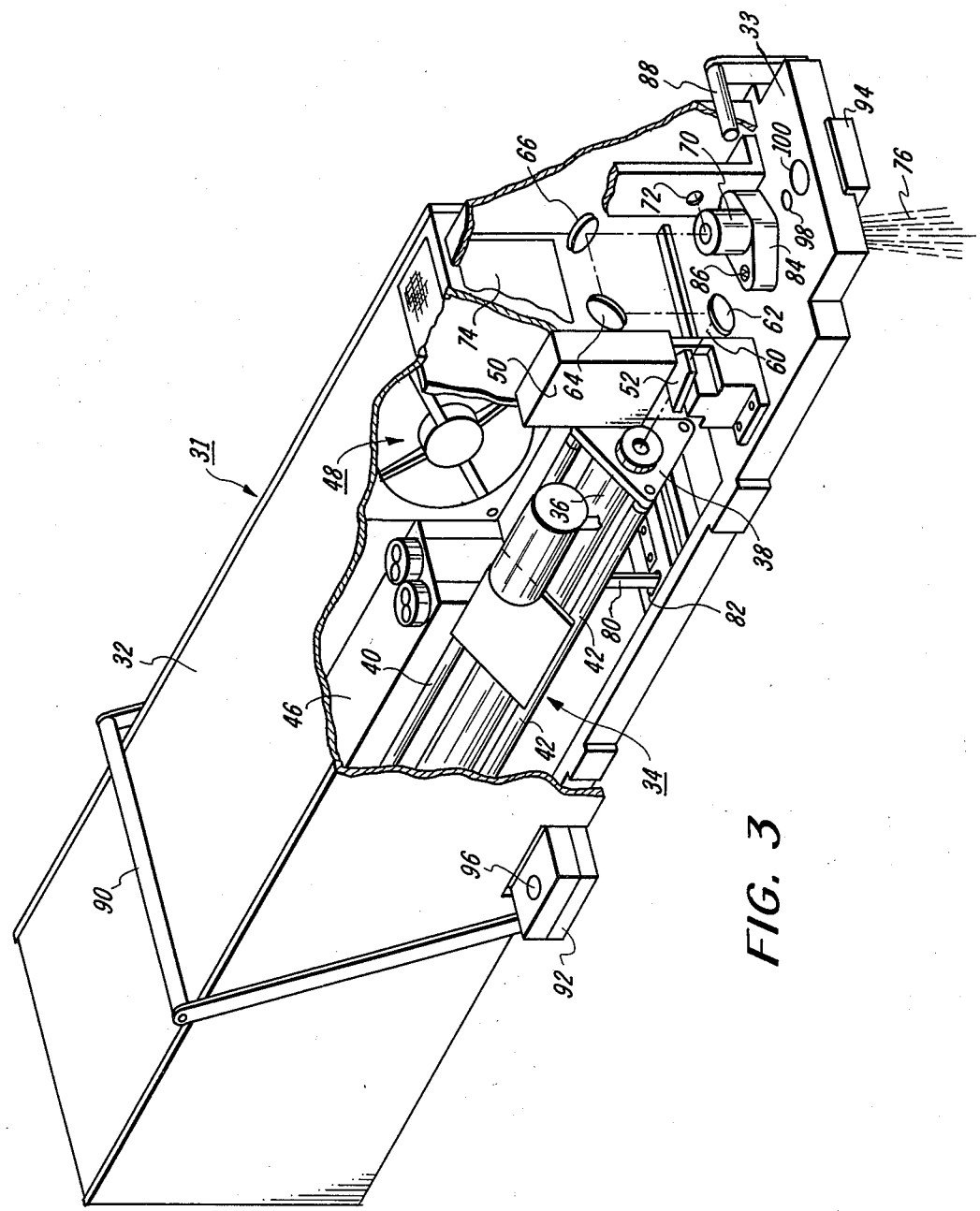
FIG. 3 is a perspective view of the laser containing module in accordance with the teachings of the present invention.

In particular, the elements 1, 3, 4, 7 and 9 (along with additional elements not shown) shown in FIG. 1 are fixedly mounted to a common support member with other components to form an illuminator module 31 as shown in FIG. 3.

FIG. 3 shows a cutaway perspective view of the laser containing module 31 in accordance with the teachings of the present invention. Module 31 will be referred to hereinafter as an illuminator module to describe the function it performs i.e. providing a beam of laser light to illuminate a scanner device (i.e. scanner 17 of FIG. 1). The illuminator module 31 comprises an external cover 32 which encloses an internal arrangement of elements mounted to a base plate member 33. A plasma tube assembly 34 comprises laser tube 36 mounted to a triangular shaped support member 38 at both ends (only one support member 38 is illustrated). The plasma tube assembly 34 in turn is supported by elongated rods 40 and 42 which function to minimize any change in the physical dimensions of the laser 36 due to heat or other ambient effects. The laser electronics assembly 46 and vent member 48 also are supported within illuminator module 31. The acousto-optic modulator driver 50 is mounted within illuminator module 31 and is coupled electronically to the acousto-optic modulator 52 in a well known manner. The output laser beam 60 is directed through acousto-optic modulator 52 and reflected by mirrors 62, 64 and 66 (mounting of mirrors not shown for purposes of clarity in the figure) and directed to a cylindrical lens holder 70 which holds a beam expanding cylindrical lens (equivalent to cylindrical lens 9 of FIG. 1). A portion of the beam directed to cylindrical lens holder 70 is directed to a detector 72, the detected beam being processed by electronics assembly 74 to provide a signal to modify the beam characteristics if necessary. The cylindrical lens forms a fan fold beam 76 which passes through an aperture 75 (FIG. 4A) in module base plate member 33. The plasma tube assembly 34 is mounted to base plate member 33 via support rod 80, rod 80 being inserted into base plate member 33 via opening, or channel 82. Although not shown, rod 80 is mounted to the base plate 33 by means of screws on the opposite side of base plate member 33. Another rod (not shown) is also utilized to mount the plasma tube assembly 34 in the base plate member 33. As is shown in the figure, lens holder 70 is affixed to a support member 84, screw 86 securing support member 84 to the base plate member 33. A forward installation handle 88 and rear installation handle 90 are coupled to the illuminator module 31 to assist a field service representative in removing from or installing the illuminator module 31 into the laser printing system as will be described hereinafter with reference to FIG. 4. Mounting pads 92 and 94 allow the illuminator module 31 to be supported and accurately located with respect to the other portions of the printing system. Mounting pad 92 includes an aperture 96 therethrough and plate member 33 has apertures 98 and 100 aligned with respect to mounting pad 94. Apertures 96 and 98 are adapted to receive fastening screws to secure illuminator module 31 to the printing system once it is accurately located. Although not shown, other portions of the laser printing system could be modularized. For example, polygon 17, objective lens 11 and cylindrical lens 20 could be packaged in a separate module. An example of a laser printing system which uses elements also utilized in the present invention is disclosed in U.S. Pat. No. 4,027,961.

In accordance with the principles of the present invention, the alignment of the cylindrical lens in holder 70 with respect to laser beam 60 is always maintained since both the plasma tube assembly 34 and the cylindrical lens holder 70 (and therefore the cylindrical lens therein) are mounted or affixed to common base plate member 33. When in place, the illuminator module 31 (or a replacement module) is also optically aligned with other elements interposed in the beam path such as imaging lens 11 and polygon 16 (FIG. 1) as will be described in more detail with reference to FIG. 4. If an element in the module 31 becomes defective (most likely laser 36 will fail first), the field representative servicing the overall laser printing system will remove illuminator module 31 utilizing handles 88 and 90. At the service area, cover 32 will be removed, the defective component (laser) removed and replaced, the cover 32 replaced, the illuminator module 31 being ready for use as a replacement in the same or a different laser printing system. In the interim, a similar illuminator module is placed into the same position occupied by the removed illuminator module 31.

Figure 4B:
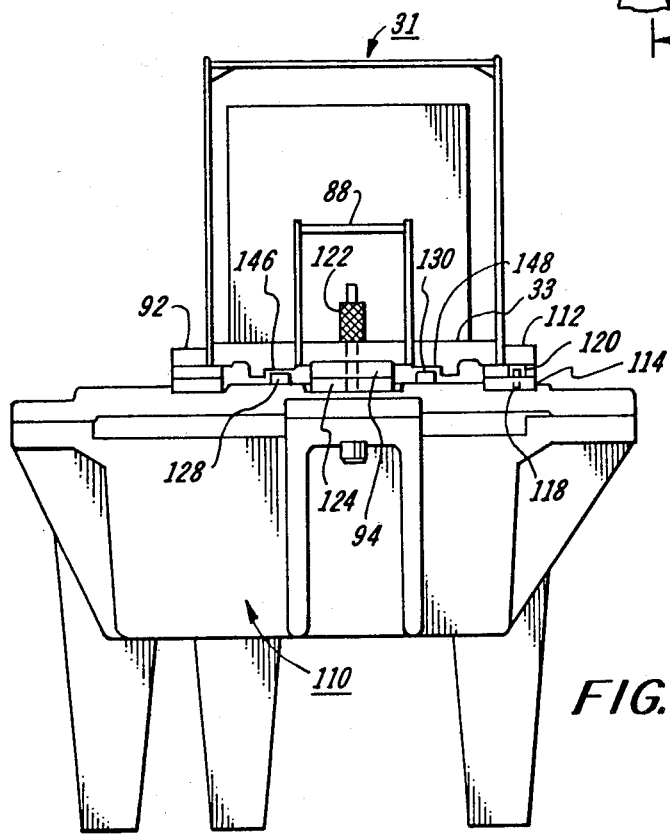
FIGS. 4(a) and 4(b) are side and front elevation views, respectively, illustrating how the module of FIG. 3 is positioned in the laser printing system of the present invention.
Figure 4A:
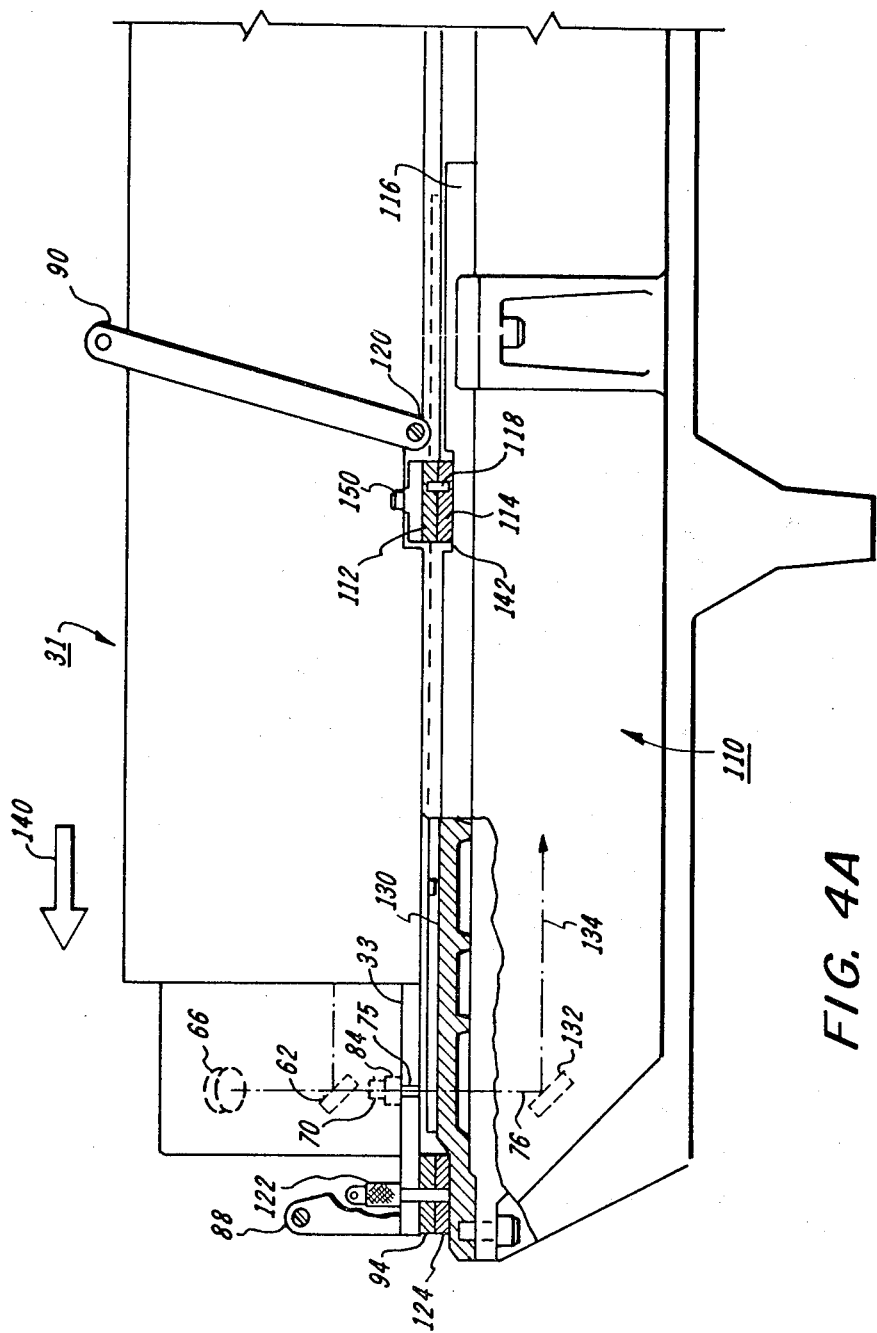

Referring now to FIGS. 4(a) and 4(b), side and front elevation views, respectively, of the illuminator module 31 in the operative mode positioned with respect to an assembly portion 110 of the laser printing system is illustrated. Portion 110 may be referred to as an optical assembly and may comprise imaging lens 11, scanner 17 and cylindrical lens 20 shown in FIG. 1. The third mounting pad 112 is shown in FIGS. 4(a) and 4(b) and is positioned over a mounting pad 114 fixed on optical assembly casting 116 and formed as part of assembly 110. A pin 118 secured to mounting pad 114 is shown positioned against the far side of a slot 120 formed in mounting pad 112. A locator pin 122 is shown positioned in aperture 100, the aperture 100 extending through base plate member 33 and through mounting pad 94 and into an aperture formed in mounting pad 124 formed as part of casting 116. Two guide rails 128 and 130 are also formed on casting 116. The base plate member 33 of illuminator module 31, in the operative mode position, does not engage the guide rails 128 and 130.

The locator pin 122 and the combination of pin 118 and slot 120 accurately locate the illuminator module 31 with respect to the optical assembly 110. As indicated, beam 76 enters the optical assembly 110 and is incident on mirror 132, which reflects the beam (as beam 134) towards the scanner 17 (not shown). As shown in the figure, the height of the illuminator module mounting pads is greater than the height of rails 128 and 130 such that the main portion of the illuminator module 31 is not in physical contact with the optical assembly.

In order to remove illuminator module 31 from the printing apparatus, locator pin 122 is removed (and the appropriate fastening members, described hereinafter, removed), and the handles 88 and 90 are gripped by the service representative and pulled in the direction of arrow 140. When the illumination module 31 is moved past point 142, surfaces 146 and 148 engage rails 128 and 130, respectively, the module 31 sliding along the rails 128 and 130 and being removed from the printing apparatus. When it is desired to return the illuminator module 31, or a different module which is similarly configured (at least as to the external components and the location of the aperture in base plate member 33), the module is placed on the rails and moved in a direction opposite to arrow 140. When the slot 120 engages pin 118, the illuminator module 31 motion is stopped, the front thereof being positioned until the aperture 100 through the base plate 33 is aligned with the hole in mounting plate 124. At this time, locator pin 122 is reinserted into the aperture 100, the module thereby being properly positioned and aligned with the optical assembly 110.

Apertures 96 and 98 in mounting pads 92 and 94, respectively, are provided to receive fastening members (not shown), such as screws, to secure the illuminator module 31 to the optical assembly 110 to minimize the possibility of misalignment of module 31 with respect to optical assembly 110. A fastening member 150 in mounting pad 112 may also be provided for this purpose.

In this maner, the illuminator module 31, or a similarly configured module, is accurately aligned with respect to optical assembly 110.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. In a laser printing system having means for generating a beam of high intensity light, a recording medium sensitive to said high intensity light, optical means comprising a plurality of optical elements interposed between said light generating means and said recording medium for imaging said beam to a spot at the surface of said medium, modulating means located between said light generating means and a scanner device for modulating the light beam in accordance with the information content of electrical signals, said scanner device comprising a multi-faceted polygon located in the path of said modulated beam between said beam generating means and said recording medium and having reflective facets for reflecting the beam incident thereon onto said medium, means for rotating said polygon such that the reflected light is scanned in successive traces across said medium, the improvement comprising:

a first module forming a part of said laser printing system, said first module comprising said light beam generating means and at least one of said optical elements, said light beam generating means and said at least one of said optical elements being mounted on a common base member, said first module being adapted to be removed from said laser printing system and replaced with a second module, similar to said first module, the beam of light provided by a beam generating means in said second module and exiting therefrom being maintained in optical alignment with other elements in said laser printing system external to said second module within predetermined tolerances, the light beam generated by said light beam generating means in said first module being in optical alignment with other elements in said laser printing system external to said first module and also being within said predetermined tolerances.

2. The improvement as defined in claim 1 wherein said beam generating means is a laser.

3. The improvement as defined in claim 2 wherein said at least one of said optical elements comprises a cylindrical lens.

4. In a laser printing system having means for generating a beam of high intensity light, a recording medium sensitive to said high intensity light, optical means comprising a plurality of optical elements interposed between said light generating means and said recording medium for imaging said beam to a spot at the surface of said medium, modulating means located between said light generating means and a scanner device for modulating the light beam in accordance with the information content of electrical signals, said scanner device comprising a multi-faceted polygon located in the path of said modulated beam between said beam generating means and said recording medium and having reflective facets for reflecting the beam incident thereon onto said medium, means for rotating said polygon such that the reflected light is scanned in successive traces across said medium, the improvement comprising:

a first module forming a part of said laser printing system, said first module comprising said light beam generating means and at least one of said optical elements, said light beam generating means and said at least one of said optical elements being mounted on a common base member, said first module being adapted to be removed from said laser printing system and replaced with a second module, similar to said first module, the beam of light provided by a beam generating means in said second module and exiting therefrom being in substantial optical alignment with other elements in said laser printing apparatus external to said second module, said first and second modules including means through which said beam of high intensity light exits said first and second modules, said laser printing system including means associated therewith to locate and secure said first module or said second module whereby the beam of light exiting from said first module or said second module is in substantial optical alignment with other elements in said printing apparatus external to said first module or said second module.

5. The improvement as defined in claim 4 wherein said beam generating means comprises a laser.

6. The improvement as defined in claim 5 wherein said laser comprises a helium-cadmium laser.

7. The improvement as defined in claim 4 wherein said at least one of said optical elements comprises a cylindrical lens.

8. A method for maintaining laser beam alignment in a laser printing system, said laser printing system comprising means for generating a beam of high intensity light, a recording medim sensitive to said high intensity light, optical means comprising a plurality of optical elements interposed between said light generating means and said recording medium for imaging said beam to a spot at the surface of said medium, modulating means located between said light generating means and a scanner device for modulating the light beam in accordance with the information content of electrical signals, the scanner device comprising a multi-faceted polygon located in the path of said modulated beam between said beam generating means and said recording medium and having reflective facets for reflecting the beam incident thereon onto said medium, and means for rotating said polygon such that the reflected light is scanned in successive traces across said medium, said method comprising the step of:

modularizing said laser printing system such that a first module is provided which comprises said light beam generating means at least one of said optical elements, said light beam generating means and said at least one of said optical elements being mounted on a common base member wherein the relative alignment of the beam of high intensity light with respect to the optical axis of said at least one of said optical elements is maintained within a first predetermined tolerance range, removing said first module from the laser printing system when the performance of said light beam generating means is unacceptable, and replacing said first module with a second module similar to said first module, the beam of light provided by a beam generating means in said second module and exiting therefrom being in optical alignment with other elements in said laser printing system external to said second module within a second predetermined tolerance range, the light beam generated by said light beam generating means in said first module being in optical alignment with other elements in said laser printing system external to said first module and also being within said second tolerance range.

9. A method for maintaining laser beam alignment in a laser printing system, said laser printing system comprising means for generating a beam of high intensity light, a recording medium sensitive to said high intensity light, optical means comprising a plurality of optical elements interposed between said light generating means and said recording medium for imaging said beam to a spot at the surface of said medium, modulating means located between said light generating means and a scanner device for modulating the light beam in accordance with the information content of electrical signals, the scanner device comprising a multi-faceted polygon located in the path of said modulated beam between said beam generating means and said recording medium and having reflective facets for reflecting the beam incident thereon onto said medium, and means for rotating said polygon such that the reflected light is scanned in successive traces across said medium, said method comprising the steps of:

modularizing said laser printing system such that a first module is provided which comprises said light beam generating means and at least one of said optical elements, said light beam generating means and said at least one of said optical elements being mounted on a common base member wherein the relative alignment of the beam of high intensity light with respect to the optical axis of said at least one of said optical elements is maintained within predetermined tolerances, removing said first module from the laser printing system when the performance of said light beam generating means is unacceptable, and replacing said first module with a second module similar to said first module, said laser printing system having locating and securing means associated therewith to locate and secure said first module or said second module, whereby the beam of light provided by a beam generating means in said first or second module and exiting therefrom is in substantial optical alignment with other elements in said printing system external to said first module or said second module.

10. The method as defined in claim 9 wherein said beam generating means comprise a laser.

11. The method as defined in claim 10 wherein said lasers comprise helium-cadmium lasers.

12. The method as defined in claim 9 wherein said at least one of said optical elements comprises a cylindrical lens.

* * * * *